April 29, 1952 H. C. MAY ET AL 2,594,576
FLUID PRESSURE CONTROL APPARATUS
Original Filed Feb. 10, 1944 3 Sheets-Sheet 3

INVENTORS
*Harry C. May*
*Roy R. Stevens*
BY
ATTORNEY

Patented Apr. 29, 1952

2,594,576

UNITED STATES PATENT OFFICE 2,594,576

FLUID PRESSURE CONTROL APPARATUS

Harry C. May, East McKeesport, and Roy R. Stevens, Forest Hills, Pa., assignors to Westinghouse Air Brake Company, a corporation of Pennsylvania Original application February 10, 1944, Serial No. 521,798. Divided and this application December 28, 1944, Serial No. 570,104

5 Claims. (Cl. 137—78)

1

This invention relates to fluid pressure control apparatus and more particularly to means adapted to be controlled by fluid under pressure for controlling a plurality of different operations such as incident to controlling reversible internal combustion engines; the present application being a division of our copending application Serial No. 521,798, filed February 10, 1944.

One object of the invention is the provision of an improved fluid pressure supply system for an apparatus such as above described.

Another object of the invention is the provision of an apparatus of the above type embodying means for insuring the integrity of operation of the apparatus in case of certain failures and to also prevent certain operations when not desired.

Other objects and advantages will be apparent from the following more detailed description of the invention.

In the accompanying drawings.

Figures 1, 9, 10, 11:
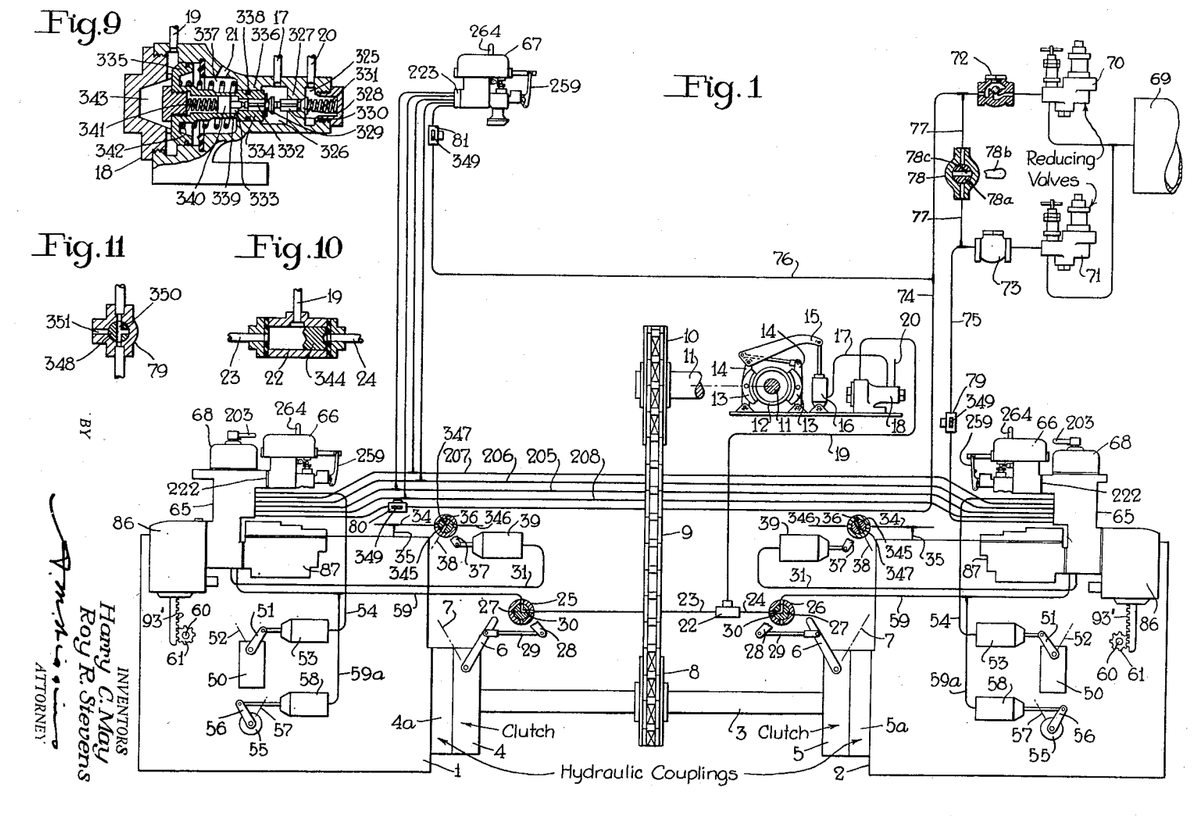
Fig. 1 is a diagrammatic view, mainly in elevation, of a pneumatic control system for a plurality of engines embodying the invention.
Figs. 9, 10 and 11 are horizontal sectional views of different elements shown in outline in Fig. 1.

In Fig. 1 of the drawings, the reference numerals 1 and 2 indicate two like internal combustion engines of the reversible Diesel type which are arranged to be connected through constantly effective hydraulic couplings 4a and 5a and releasable clutches 4 and 5 respectively, to a common drive shaft 3.

A sprocket wheel 8 secured to turn with the drive shaft 3 is connected by a chain 9 to a sprocket wheel 10 which is arranged to turn a shaft 11 which may be a ship's propeller shaft.

2

A brake is associated with propeller shaft 11 for braking same to stop either or both of the engines 1 and 2. This brake may comprise a brake drum 12 arranged to turn with the propeller shaft 11, and brake shoes 13 arranged at opposite sides of the brake drum for frictionally engaging same. The brake shoes 13 are carried by levers 14 which are operably connected to a controlling lever 15. One end of lever 15 is operatively connected to a brake cylinder device 16 arranged to be operated by fluid under pressure supplied through a pipe 17 for actuating said lever to move the brake shoes 13 into frictional engagement with drum 12. Upon release of fluid under pressure from said brake cylinder device by way of pipe 17, lever 15 will operate to allow release movement of the brake shoes 13 away from the brake drum.

The supply and release of fluid under pressure to and from the brake cylinder device 16 by way of pipe 17 is arranged to be controlled by a relay valve device 18. The relay valve device 18 comprises, as shown in Fig. 9 of the drawing, a casing having chambers 325 and 326 separated by a wall 327 and containing, respectively, two coaxially aligned poppet valves 328 and 329 arranged to seat in the same direction. The valve 328 has a fluted steam 330 extending through a bore in wall 327 into chamber 326 wherein it engages the valve 329. A spring 331 in chamber 325 acts on valve 328 urging it toward a seat provided on wall 327.

The valve 329 has a fluted stem 332 arranged to slide in a portion of a bore 333 provided in a plunger 334 which projects from one side of a piston 335 and which is slidably mounted in a bore provided through a wall 336 separating chamber 326 from a chamber 337 at said one side of said piston. A sealing ring 338 carried by plunger 334 has sliding and sealing contact with the surface of the bore through wall 336 to prevent leakage of fluid under pressure from chamber 326 past said plunger to chamber 337. A seat is provided on the end of plunger 334 for engagement by valve 329.

The bore 333 in plunger 334 is open through one or more ports 339 to chamber 337 and slidably mounted in said bore is a follower 340 one end of which engages the valve stem 332. A precompressed spring 341 contained in bore 333 is interposed between the opposite end of plunger 340 and the piston 335 for unseating valve 329 from the end of plunger 334. A coil spring 342 encircling plunger 334 in chamber 337 has one end supported on the casing wall 336 while the opposite end bears against piston 335. Spring 342 is also under pressure and is constantly effective to urge the piston 335 to the position shown in the drawing for pulling plunger 334 out of seating engagement with 329.

The valve chamber 326 is open to a fluid pressure supply pipe 20 adapted to be supplied with fluid under pressure from any suitable source. Valve chamber 326 is connected to pipe 17 leading to the brake cylinder device 16. Chamber 337 is open to atmosphere through a port 21, while at the opposite side of piston 335 is a control chamber 343 which is connected to a control pipe 19.

The operation of the relay valve device 18 is as follows:

When fluid under pressure is supplied to chamber 343, in a manner which will be later described, the piston 335 will move against spring 342 and shift the plunger 334 first into seating engagement with valve 329 and then act through said valve to open valve 328. When valve 328 is thus unseated, fluid under pressure from the supply pipe 20 will flow to pipe 17 and thence to the brake cylinder device 16 to effect operation of said device to apply the brake to the propeller shaft 11, as above described.

Upon release of fluid under pressure from piston chamber 343, spring 342 will return piston 335 to the position shown in the drawing. The pressure of spring 331 on the valve 328 is greater than the opposing pressure of spring 341 on the valve stem 332, so that, as piston 335 is returned to the position shown in the drawing, the spring 331 will move the two valves 328 and 329 in unison and with said piston until valve 328 becomes seated to cut-off the supply of fluid under pressure to the brake cylinder pipe 17. After valve 328 is seated, the spring 341 will hold valve 329 against movement, so that, plunger 334 moving with piston 335 as it returns to the position shown in the drawing, will move out of seating engagement with valve 329 and thereby open pipe 17 to atmosphere by way of chamber 337 and port 21 for releasing fluid under pressure from the brake cylinder device 16 to thereby release the brake on the propeller shaft 11, as above described.

The pipe 19 leads to the side outlet of a double check valve device 22, the opposite end outlets of which device are connected by pipes 23 and 24 to brake interlock valve devices 25 and 26 associated with the clutches 4 and 5, respectively. The double check valve device 22 is of conventional structure and, as shown in Fig. 10 of the drawings, comprises a shuttle valve 344 which upon supply of fluid under pressure to pipe 23 with pipe 24 vented, will operate in the usual manner to open pipe 23 to pipe 19 and close communication between pipe 19 and pipe 24, while upon supply of fluid under pressure to pipe 24 with pipe 23 vented the shuttle valve 344 will operate to open pipe 24 to pipe 19 and close communication between pipes 19 and 23.

The supply and release of fluid under pressure to and from the pipes 23 and 24 is under the control of the brake interlock valve devices 25 and 26, respectively. These devices are identical in construction and, for illustrative purposes, each may comprise a casing containing a rotary type plug valve 27 arranged to be turned to either of two different positions by a lever 28. At the interlock valve device 25, the end of lever 28 is connected by a rod 29 to the clutch control lever 6 associated with engine 1, while at the brake interlock valve device 26, the lever 28 is connected by a corresponding rod 29 to the clutch control lever 6 associated with engine 2. It will thus be seen that movement of either clutch control lever 6 to its engaged position or its disengaged position will turn the respective plug valve 27 to corresponding positions.

The plug valve 27 in each of the brake interlock valve devices 25 and 26 is provided with a passage 30 arranged to connect the respective pipe 23 or 24 to atmosphere when the respective clutch control lever 6 is in the clutch disengaged position and to connect said pipe to a control pipe 59 when the lever is in the clutch engaged position. The pipe 59 at each engine is arranged to be either supplied with fluid under pressure or to be opened to the atmosphere in a manner which will be later described.

Each of the engines 1 and 2 is provided with a starting air pipe 34 through which air under pressure may be supplied to certain or all of the cylinders of the respective engine through branches 35 (only one of which is shown in the drawings) in order to effect starting of the engine in the direction determined by the timing or condition of the engine's valve gear. The supply of air under pressure to and the cut-off of such supply to pipe 34 at each engine is arranged to be controlled by a starting air valve 36.

The two starting air valve devices 36 are of identical structure and each may comprise, for the purpose of illustration only, a casing containing a rotary plug valve 345 arranged to control communication between the respective pipe 34 and a pipe 346 adapted to be supplied, from any suitable source, with engine starting compressed air. A port 347 in the plug valve 345 is provided for establishing communication between the respective pipes 346 and 34, and a lever 37 is provided for turning said rotary valve to positions for opening and closing said communication. With lever 37 of each of the starting air valves 36 in the position shown in Fig. 1 the supply of starting air to the respective pipe 34 will therefore be cut off, while upon movement of said lever to a position such as indicated by a dot and dash line 38 starting air will be supplied to said pipe, as will be apparent.

Figures 4, 5, 6, 7, 8:
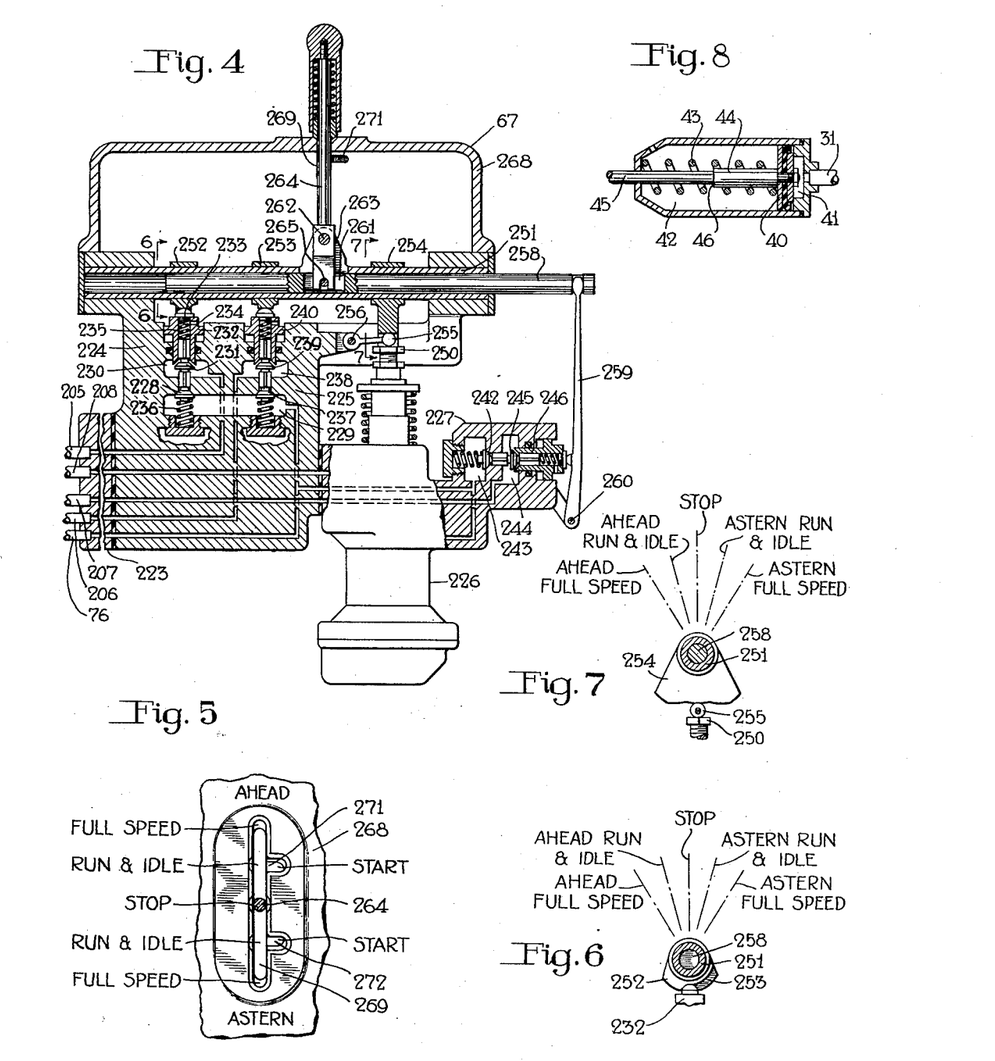
Fig. 4 is a diagrammatic sectional view of an operator's control device several of which are employed and distributed at different control stations as shown in elevation in Fig. 1.
Fig. 5 is a partial plan view of the operator's control device shown in Fig. 4.
Figs. 6 and 7 are sectional views taken on the lines 6—6 and 7—7, respectively, in Fig. 4.
Fig. 8 is a sectional view of a pneumatic cylinder several of which are shown in elevation in Fig. 1.

Movement of lever 37 of each of the starting air valves 36 to its different positions may be controlled by a starting control cylinder 39 which is in turn controlled by pressure of fluid in a control pipe 31. Each of the cylinders 39 may comprise, as shown in Fig. 8, a piston 40 having at one side a pressure chamber 41 open to the control pipe 31 and having at the opposite side a non-pressure chamber 42 containing a spring 43 acting on the piston for urging it to the position shown when the respective control pipe 31 is devoid of fluid pressure. Upon supply of fluid under pressure through the control pipe 31 and thus to pressure chamber 41, the piston 40 will move against the opposing pressure of spring 43. The piston 40 is provided with a rod 44, a reduced portion 45 of which extends through a suitable bore in the casing and has its end operatively connected to the end of lever 37 of the respective starting air valve 36. At the junction of the larger and smaller portions of the piston rod 44 is a shoulder 46 arranged to engage the end of the casing for limiting movement of the piston 40 by pressure of fluid provided in chamber 41. With this construction it will be seen that with piston 40 in the position in which it is shown in Fig. 8, which condition will be obtained with chamber 41 open to atmosphere, the respective starting air valve 36 will cut off the supply of starting air to pipe 34, while upon movement of piston 40 by pressure of fluid in chamber 41 to the position in which shoulder 46 on the piston rod engages the casing, the respective air valve 36 will be moved to the position for supplying starting air to the starting air pipe 34.

Each of the engines 1 and 2 is provided with a conventional speed governor 50 arranged to be driven by and to operate at a speed proportional to that of the engine for limiting the fuel supply to and thus the speed of the engine in accordance with the adjustment of a governor control lever 51. The lever 51 may have an engine idling position in which it is shown in the drawing and may be adjusted to any position between this idling position and a maximum speed position such as indicated by a dot and dash line 52. The lever 51 of the governor on each engine is connected to a speed control cylinder 53 arranged to be controlled by pressure of fluid in a pipe 54.

Each of the speed control cylinders 53, may, for the purpose of illustration, be identical to the starting control cylinder 39 and thus operative with the respective pipe 54 open to atmosphere to move the connected governor control lever 51 to the engine idling position, and operative upon supply of fluid to said pipe to adjust said lever out of the idling position to a position corresponding to the pressure of such fluid. A certain maximum pressure of fluid in the control pipe 54 will cause operation of each speed control cylinder 53 to move the respective governor control lever 51 to the maximum speed position indicated by the dot and dash line 52, as will be apparent. The control of pressure of fluid in pipe 54 at each of the engines will be hereinafter described.

Associated with each of the engines 1 and 2 is a fuel cut-off device 55 which may be arranged to cut off the supply of fuel to the respective engine in any conventional manner, such for example as by rendering the fuel pumps on the engine ineffective to provide fuel to the engine's injectors. Each fuel cut-off device 55 may be controlled by a lever 56 having a fuel cut-off position in which it is shown in Fig. 1 and which is movable from this position to a fuel cut-in position indicated by a dot and dash line 57. For moving lever 56 of each fuel cut-off device 55 to its different positions it may be connected to a fuel cut-off cylinder 58 which in the present embodiment may be like the cylinders 53 and 39 above described and which is arranged to be controlled through a pipe 59a connected to pipe 59. When fluid under pressure is supplied to pipes 59 and 59a on each engine the respective cylinder 58 will act to move lever 56 of the respective fuel cut-off device 55 to its fuel cut-off position in order to allow stopping of the engine, while upon release of fluid under pressure from said pipes the cylinder 58 will cause movement of said lever to its fuel supply position, indicated by the dot and dash line 57, to allow supply of fuel to said engine.

Each of the engines is provided with a rockable shaft 60 for controlling, in any conventional manner as by gears 61 and racks 93′ the reversing of the valve timing or valve gear of the respective engine to provide for starting and operation of the engine in either one direction or in the reverse direction. A gear 61 is secured to each of the shafts 60 for turning same and this gear in turn is arranged to be operated in a manner and by means which will be later described.

Engines having characteristics and arranged to be controlled by means such as above set forth briefly are well known to those versed in the art, and since the specific structures of such means and of the engines are not essential to a clear understanding of the invention, any further discussion thereof would only involve unnecessary complications in the present application and hence will be dispensed with.

The system for controlling the starting, stopping, reversing, etc., of the engines 1 and 2 comprises what may be called a maneuvering control device 65 associated with each engine, an operator's or engineer's control valve device 66 associated with each of said maneuvering control devices for individually controlling the respective engine, a remote or pilot's control valve device 67 for controlling in multiple or individually the two engines through the respective maneuvering control devices 65, and a station selector valve device 68 associated with each maneuvering control device 65 for selectively rendering the engines controllable by the respective engineer's control device 66 or by the pilot's control device 67.

According to one feature of the invention, the control system further embodies a dual fluid pressure supply system which normally provides an individual supply of fluid under pressure to each of the maneuvering control devices 65 and engineer's control devices 66. This dual fluid pressure supply system embodies a source of fluid pressure, such as may be provided in a storage reservoir 69, and two reducing valve devices 70 and 71 of any suitable structure arranged to supply fluid from this reservoir at a desired reduced pressure through check valves 72 and 73, of identical structure, to pipes 74 and 75 leading to the maneuvering control devices 65 and engineer's control devices 66 associated with engines 1 and 2, respectively. The pilot's control valve device 67 is supplied with fluid under pressure through a pipe 76 connected to pipe 74. The two pipes 74 and 75 are connected by a pipe 77 in which is arranged a cut-off valve device 78. The cut-off valve device 78 may comprise a casing containing a rotary valve 78a having a closed position in which it is shown in the drawing, and which is adapted to be turned by a handle 78b through an arc of 90° to an open position. The valve 78a has a port 78c adapted in the open position to establish communication through pipe 77. In the closed position of valve 78a this communication will be closed.

Normally the rotary valve 78a will be in its closed position, but in case of failure of the supply of fluid under pressure to either of the pipes 74 or 75, due for example to failure of the respective reducing valve device 70 or 71, said valve may be turned to its open position so as to supply fluid under pressure to both of said pipes from the reducing valve device still operating, the check valve 72 or 73 preventing back flow of fluid under pressure to the reducing valve device which may have failed so as to prevent loss of such fluid pressure in case the failure would be such as to permit escape of fluid under pressure to the atmosphere.

According to another feature of the invention, individual cut-off valve devices 79, 80 and 81 are provided in pipes 75, 74 and 76, respectively, to cut-off the supply of fluid under pressure to the maneuvering control devices 65 and to the pilot's control valve device 67 in case of failure of said devices or to permit repair thereof without loss of fluid under pressure from the reservoir 69.

The cut-off valve devices 79, 80 and 81 are of identical structure and each may comprise, as shown in Fig. 11 of the drawings which is a horizontal sectional view of the cut-off valve device 79 as seen in Fig. 1, a casing containing a rotary plug valve 348 having an open position in which it is shown in the drawing and which is adapted to be turned by a key 349 (Fig. 1) in a clockwise direction through an arc of 90° to a closed position. The plug valve 348 has a T port 350 adapted in the open position to establish communication between the respective pipes connected to opposite ends of the casing. In the closed position of valve 348, this communication is closed and the T port 350 connects the pipe at the fluid pressure outlet side of the valve device to an atmospheric vent port 351, and this is of particular importance in connection with the cut-off valve devices 79 and 80, as will be later brought out.

Each maneuvering control device 65 comprises (Fig. 2) a bracket 85 upon which is removably mounted a fluid motor 86 for reversing the valve gear or timing of the respective engine, and a timing or interlock valve device 87. Also removably mounted on each bracket 85 is the respective engineer's control valve device 66 and station selector valve device 68.

Figures 2, 3:
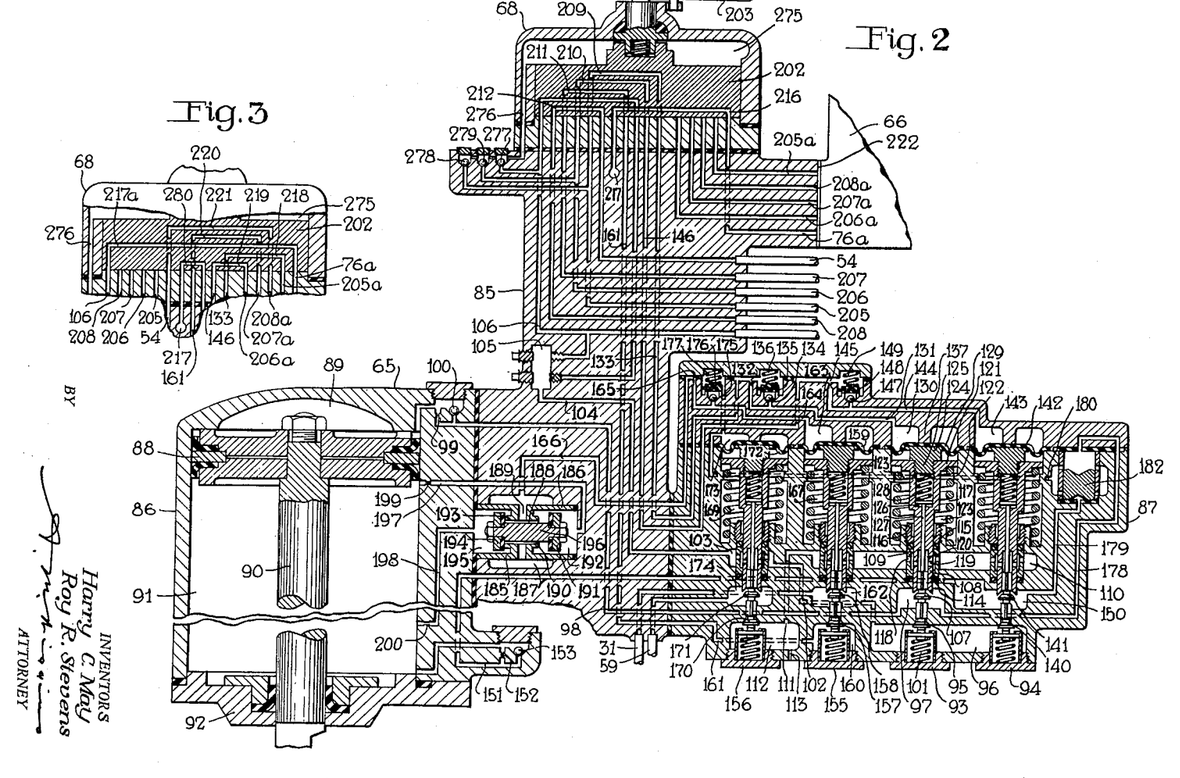
Fig. 2 is a vertical, sectional view of a pneumatic control device associated with each of the engines shown in Fig. 1 for controlling the individual starting, stopping, reversing, etc., of the respective engine.
Fig. 3 is a diagrammatic sectional view of a portion of a selector valve device shown in Fig. 1 in elevation and in Fig. 2 in section, but with the selector or rotary valve in a different position than shown in Fig. 2.

Each fluid motor 86, which may hereafter be referred to as the reversing motor, comprises a cylinder containing a double acting piston 88 having at one side a pressure chamber 89 and provided with a rod 90 projecting from the opposite side through a pressure chamber 91 and a pressure head 92 to the exterior of the casing. Outside of the pressure head 92 the rod 90 is provided with gear teeth 93' (Fig. 1), constituting a rack, in mesh with gear 61 of the respective engine, whereby movement of the piston 88 in its cylinder will operate the gear 61 to turn the reversing shaft 60. The piston 88 has two operating positions, namely, the position in which it is shown in Fig. 2 for positioning the shaft 60 to provide for operation of the respective engine in one or what may be called an astern direction, and a second position in contact with the pressure head 92 for conditioning shaft 60 to provide for operation of the respective engine in the reverse, or an ahead direction. Movement of the piston 88 to the astern position shown in Fig. 2 is arranged to be effected by supplying fluid under pressure to chamber 91 to act on one face of the piston while opening chamber 89 at the opposite face to atmosphere. Movement of piston 88 to its ahead position in contact with the pressure head 92 is arranged to be effected by supplying fluid under pressure to chamber 89 while opening chamber 91 to the atmosphere.

In each maneuvering control device the supply and release of fluid under pressure to and from chamber 89 is controlled by means of an ahead control valve device 93, while the supply and release of fluid under pressure to and from chamber 91 is controlled by means of an astern control valve device 94 both of which devices constitute parts of the interlock valve device 87.

The ahead control valve device 93 in each maneuvering control device comprises a supply valve 95 contained in a chamber 96 and arranged to control flow of fluid under pressure from said chamber to a chamber 97 which is connected to chamber 89 through a passage 98 and a choke 99, and also by way of a check valve 100 by-passing said choke, the check valve being arranged to allow relatively rapid flow of fluid under pressure in the direction toward chamber 89 but to close upon reverse or out-flow of fluid under pressure from said chamber to render the choke 99 effective to control the rate of such out-flow. The chamber 96 containing the supply valve 95 also contains a spring 101 constantly effective on said valve for urging it to its closed position shown.

In each maneuvering control device 65 chamber 96 is open through a passage 102, a chamber 103, passage 104 and a chamber 105 to a passage 106 in the bracket 85. This passage 106 in the maneuvering control device associated with engine 1 is arranged to be constantly supplied with fluid under pressure from pipe 74 by way of the cut-out valve device 80 when the valve device is in its open position, while in the maneuvering control device associated with engine 2 the passage 106 will constantly be supplied with fluid under pressure from pipe 75 with the cut-out valve device 79 in its open position.

The ahead control valve device 93 in each maneuvering control device 65 further comprises a fluid pressure release valve 107 contained in chamber 97 and engaging the end of a stem projecting from the supply valve 95 whereby the two valves are movable in unison. The release valve 107 has a fluted stem slidably mounted in a bore 120 provided in a plunger 108 which in turn is mounted to slide in a bore provided in a bushing 109 extending through a chamber 110 which is in constant communication with the atmosphere through a passage 111, a chamber 112, and a port 113. The lower end of bushing 109 engages a ring seal 114 encircling and having sliding contact with the periphery of plunger 108, while engaging the upper end of said bushing is a similar seal 115 also having sliding contact with the periphery of plunger 108. These seals are held under compression at opposite ends of the bushing 109 and in contact with plunger 108 by a nut 116 and are respectively effective to prevent leakage of fluid under pressure along said plunger from chamber 97 to chamber 110 and from chamber 110 to a chamber 117 into which the plunger 108 extends. The bushing 109 is provided with an annular cavity encircling the plunger 108 and open through a plurality of ports 118 to chamber 110. The plunger 108 is also provided with a plurality of ports 119 establishing communication between ports 118 and bore 120 within the plunger 108.

The plunger 108 is provided in chamber 117 with a head 121 disposed above an annular stop shoulder 122 provided for engagement with said head to limit downward movement thereof, and interposed between this head and the opposite end of chamber 117 is a spring 123 which is under a chosen degree of pressure. A diaphragm follower 124 is secured to the opposite face of head 121 by means of a stud 125 having screwthreaded engagement in a bore extending through said head and into the plunger 108, and mounted in this bore below the stud is a follower 126 having a stem 127 extending through a bore in the plunger and having its end engaging the end of the stem projecting from the release valve 107. An initially compressed spring 128 is interposed between the end of stud 125 and the follower 126 for holding the release valve 107 against movement upon movement of plunger 108 in a direction away from said release valve with the supply valve 95 closed.

The follower 124 engages one side of a flexible diaphragm 129 which has at its opposite side a timing chamber 130. The chamber 130 is connected through a passage 131, a choke 132 and a passage 133 to the respective station selector valve device 68. By-passing the choke 132 is a communication including two check valves 134 and 135, arranged to permit flow of fluid from chamber 130 around the choke 132 at a relatively rapid rate but to prevent flow in the reverse direction, so that inflow of fluid pressure to said chamber may be limited by the flow capacity of choke 132. The check valve 135 is subject to the seating pressure of a light bias spring 136.

With chamber 130 at atmospheric pressure or charged with fluid at a pressure below a certain degree, spring 123 will maintain the diaphragm 124 in contact with a stop 137 and the plunger 108 will be elevated by said spring to a position such as shown in the drawing to allow closing of the fluid pressure supply valve 95 by spring 101 and opening of the release valve 107 under the action of spring 128. When fluid is supplied to chamber 130 at a pressure sufficient to overcome the opposing force of spring 123, the diaphragm 129 will deflect downwardly to an extent limited by contact between plunger head 121 and the annular stop 122. The force of spring 101 against the supply valve 95 exceeds that of spring 128 against the release valve 107, as a result of which, this downward movement of diaphragm 129 and follower 124 and thereby of plunger 108 will be relative to the release valve 107 until said plunger contacts said valve which closes communication between chamber 97 and chamber 110. Further movement of the diaphragm follower will then act through the release valve 107 to open the supply valve 95.

The astern control valve device 94 in each maneuvering control device 65 is structurally identical to the ahead control valve device 93 just described and, briefly, comprises a fluid pressure supply valve 140, a fluid pressure release valve 141 and a flexible diaphragm 142 operatively connected to these valves for controlling same in accordance with pressure of fluid in a control chamber 143 which is connected through a passage 144, a choke 145 and a passage 146 to the respective station selector valve device 68. By-passing the choke 145 is a communication in which are disposed two serially arranged check valves, 147 and 148, to provide relatively rapid outflow of fluid pressure from chamber 143 but to render choke 145 effective to limit inflow. The check valve 148 is subject to the pressure of a light seating spring 149.

In the astern control valve device 94 the supply valve 140 is contained in chamber 96 and is arranged to control flow of fluid pressure from said chamber to a chamber 150 containing the release valve 141. Chamber 150 is connected through passage 151 and a choke 152 to chamber 91 below the reversing piston 88. A communication by-passing choke 152 and containing a check valve 153 is provided to allow relatively rapid inflow of fluid pressure to chamber 91 but to limit outflow of fluid pressure therefrom to a degree controlled by the flow capacity of choke 152. The release valve 141 in the astern control valve device 94 is provided for controlling the release of fluid under pressure from chamber 150 and thereby chamber 91 beneath the reversing piston 88 to chamber 110 and thence to the atmosphere.

The timing and interlock valve device 87 associated with each of the maneuvering control valve devices 65 further comprises a starting control valve device 155 for the respective engine, and a fuel and brake control valve device 156 for controlling the cut-in and cut-off of the fuel supply to the respective engine, and for also controlling the brake associated with the propeller shaft 11.

Both of the control valve devices 155 and 156 in each maneuvering control device 65 are structurally identical to the control valve devices 93 and 94 above described.

The starting control valve device therefore comprises a fluid pressure supply valve 157, a fluid pressure release valve 158 and a flexible diaphragm 159 operatively connected to said valves for controlling same. The supply valve 157 is contained in a chamber 160 which is connected by a passage 161 to the respective station selector valve device 68 and said valve is arranged to control flow of fluid from this chamber to a chamber 162 which is connected to pipe 31 leading to the starting air control cylinder 39 on the respective engine. The release valve 158 of the starting control valve device 155 is contained in chamber 162 and arranged to control a fluid pressure release communication between chamber 162 and chamber 110. The diaphragm 159 is arranged to be controlled by the pressure of a spring 167 and the opposing pressure of fluid in a chamber 163 which is connected through a passage 164 and a choke 165 to a passage 166 in the bracket 85.

The fuel and brake control valve device 156 comprises a valve 170, a valve 171 and a flexible diaphragm 172 for controlling said valves in accordance with pressure of fluid effective in a chamber 173 and the opposing pressure of a control spring 169. In the present structure the valve 170 constitutes a release valve which is contained in chamber 112 and which is arranged to release fluid under pressure from a chamber 174 to chamber 112 for flow to the atmosphere through port 113. The valve 171 constitutes a supply valve for controlling supply of fluid under pressure from chamber 103 to chamber 174 which is connected to pipes 59a and 59 leading to the fuel cut-off cylinder 58 and to the brake interlock valve device 25 or 26 associated with the respective engine. Chamber 173 is connected through a communication including two serially arranged check valves 175 and 176 to passage 164, the check valves being arranged to provide for flow of fluid under pressure from said passage to said chamber but to prevent flow in the opposite direction. The check valve 176 is subject to the light seating pressure of a bias spring 177 urging same to its closed position.

The timing and interlock device 87 associated with each maneuvering control device 65 also comprises a double check valve 182 open at opposite ends to passages 178 and 179 connected respectively to chambers 97 and 150 in the ahead and astern control valve devices 93 and 94. The double check valve 182 is arranged to control communication between the two passages 178 and 179 and a passage 180 which leads to chamber 173 above the diaphragm 172 in the fuel and brake control valve device 156. With the double check valve in the position shown it opens communication between passages 180 and 178 and closes communication between passages 180 and 179. In an opposite position the double check valve will open passage 180 to passage 179 and will close communication between passage 180 and passage 178.

In the bracket 85 of each maneuvering control device is a double check valve device 185 comprising a bushing 186 which is encircled midway between its ends by an annular cavity 187 to which is connected passage 166. The bushing 186 is provided interiorly and midway between its ends with a bridge having an axial bore 188 open to chamber 187 through a plurality of radial bores 189. At one end of the axial bore 188 is an annular seat 190 arranged for sealing engagement by a valve 191 contained in a chamber 192, while at the opposite end of said bore is an oppositely arranged annular seat 193 provided for sealing engagement by a valve 194 contained in a chamber 195. The two valves 191 and 194 are connected for movement in unison by a stem 196 loosely extending through the axial bore 188. This stem is of such construction as to allow flow of fluid past either valve 191 or 194, when unseated, to bore 188 for supply to the annular chamber 187.

Chamber 192 is connected to a passage 197 arranged to be connected to chamber 91 below the reversing piston 88 when said piston is in its upper or astern position as shown in the drawing. Chamber 195 is connected to a passage 198 arranged to be opened to chamber 89 above the reversing piston 88 when said piston is in its lower or ahead position in contact with the pressure head 92. A choke 199 is provided in passage 197 to limit flow of fluid pressure through said passage in the direction of chamber 192 in the double check valve device 185, for reasons which will be later described. The flow capacity of choke 199 is however great enough with respect to clearance space which may be provided around the double check valve 191 to allow flow of fluid past said valve to the axial bore 188, to provide a sufficient differential in fluid pressures on said valve upon said flow to move said valve into contact with seat 190 when chamber 195 containing the check valve 194 is at a pressure slightly exceeding atmospheric pressure. A similar choke 200 is provided in passage 198.

The station selector valve device 68 associated with each of the maneuvering control devices 65 comprises a rotary valve 202 contained in a chamber 275 and having two different control positions, namely a remote control position, in which it is shown in Fig. 2, to provide for control of the respective engine by operation of the pilot's control valve device 67, and a local control position, in which it is shown in Fig. 3, to provide for individual control of the engine by the respective engineer's control valve device 66. A hand operated lever 203 is operatively connected to the rotary valve 202 for turning same to its different positions.

The brackets 85 of the two maneuvering control devices 65 are connected in parallel (Fig. 1) to an ahead control pipe 205, an astern control pipe 206, a starting control pipe 207 and a speed control pipe 208, and all of these pipes are also connected to the pilot's control valve device 67. At each engine, pipe 54 connected to the speed control cylinder 53 is also connected to the respective bracket 85, as well as the fluid pressure supply pipe 74 or 75, as above described.

All of these pipes 205, 206, 207 and 208 and 54, as well as passage 106 in the bracket, which is supplied with fluid under pressure from either pipe 74 or 75, are connected to the seat of the rotary valve 202 in each of the station selector valve devices.

In the remote control position of the rotary valve 202 in each selector device 68, the ahead control pipe 205 is connected by a cavity 209 in said valve to passage 133 leading to the ahead control valve device 93, while the astern control pipe 206 is connected through a cavity 210 in said valve to passage 146 leading to the astern control valve device 94. The starting control pipe 207 is connected through a cavity 211 in said valve to passage 161 leading to the starting control valve device 155, while the speed control pipe 208 is connected by a cavity 212 in said valve to pipe 54 leading to the speed control cylinder 53.

Also connected to the seat of rotary valve 202 in each station selector valve device 68 are passages 205a, 206a, 207a, 208a and 76a. All of these passages are closed by the rotary valve 202 in its remote control position (Fig. 2) except passage 76a which is opened through a cavity 216 in said valve to an atmospheric exhaust port 217.

In the local control position of each rotary valve 202 (Fig. 3) the ends of pipes 208, 206 and 205 are lapped by said rotary valve and the fluid pressure supply passage 106 is connected by a cavity 217a to passage 76a. The ahead passage 133 and astern passage 146 are connected, respectively, by cavities 218 and 219 in the rotary valve to passages 205a and 206a. The starting control passage 161 is connected by a cavity 220 in the valve 200 to passage 207a, while the speed control pipe 54 is connected by a cavity 221 in said valve to passage 208a. In each bracket 85 the passages 205a, 206a, 207a, 208a and 76a all lead to a mounting face 222 on the bracket against which the respective engineer's control valve device 66 is adapted to be removably secured.

As above described the several pipes connected to the brackets 85 of the two maneuvering control valve devices 65 are also connected to the pilot's control valve device 67, such connections being made to a bracket 223 upon which the pilot's control valve device is removably mounted. The passages 205a, 206a, 207a, 206a, and 76a opening at the face 222 of each of the maneuvering control device brackets 85 correspond in relative position and in function to those in the bracket 223 of the pilot's control valve device 67, whereby the same control valve device can be used at the pilot's control station and at the engineer's control station at each engine.

In Fig. 4 of the drawings is shown the pilot's control valve device 67 mounted on the bracket 223, and since the engineer's control valve devices 66 are identical, except for the part upon which they are mounted, the following description of the pilot's control device 67 will therefore apply to the engineer's control device 66.

As shown in Fig. 4, the pilot's control valve device 67 comprises a base portion arranged for mounting on the bracket 223 and contains an ahead pilot valve device 224 and an astern pilot valve device 225. Mounted on the base portion is a speed control valve device 226 with which there is associated a starting control valve device 227.

The ahead pilot valve device 224 comprises a fluid pressure supply valve 228 which is contained in a chamber 229 supplied with fluid under pressure from pipe 76 and arranged to control communication between said chamber and a chamber 230 which is connected to the ahead control pipe 205. A spring 236 in chamber 229 acts on valve 228 to seat same. A release valve 231 contained in chamber 230 rests on the end of a fluted stem projecting from the supply valve 228 and has a stem slidably mounted in a bore 233 provided in a plunger 232 which is mounted to slide in the casing. The valve 231 is provided for controlling communication between chamber 230 and bore 233 in the plunger, which bore is open to the atmosphere through a passage 234. A spring 235 in bore 233 acts on the release valve stem for maintaining the release valve in contact with the stem of the supply valve 228 upon movement of the plunger 232 in a direction away from the release valve for opening communication past said release valve. Upon movement of the plunger 232 in the direction of the release valve 231, the spring 236 will maintain the supply valve 228 seated against the pressure of spring 235 acting on the release valve, whereby the plunger will initially move into contact with the release valve for closing communication between chamber 230 and the atmosphere, and will then act through said valve to unseat the supply valve 228. Upon movement of plunger 232 in the opposite direction or away from the release valve, the spring 236 will seat valve 228 followed by movement of plunger 232 out of contact with the release valve 231.

The astern pilot valve device 225 is structurally identical to the ahead pilot valve device 224 comprising a supply valve 237 contained in chamber 229 for controlling communication between said chamber and a chamber 238 which is connected to the astern control pipe 206. A release valve 239 is provided in chamber 238 for controlling communications between said chamber and the atmosphere. A plunger 240 is provided to cooperate with the release valve 239 for controlling operation thereof and of the supply valve 237.

The starting control valve device 227 may also be structurally identical to the ahead run valve device 224 and may therefore comprise a supply valve 242 contained in a chamber 243 which is supplied with fluid under pressure from pipe 76, and which valve is arranged to control flow of fluid from said pipe to a chamber 244 which is open to the starting control pipe 207. The starting control valve device further comprises a fluid pressure release valve 245 and a plunger 246 arranged to cooperate with said valve to control release of fluid under pressure from chamber 244 to the atmosphere.

The speed control valve device 226 may be of any conventional, preferably self-lapping type, such, for example, like that fully disclosed in Patent No. 2,381,222, issued on August 7, 1945, to Harry C. May, and assigned to the assignee of the present application. Briefly, this device comprises a plunger 250 operable upon displacement into the device from a normal position in which it is shown in Fig. 4, to supply fluid to the speed control pipe 208 at a pressure proportional to the degree of such displacement and to release fluid under pressure from said pipe upon movement of the plunger out of the device in accordance with the extent of such movement, and to provide for opening of said pipe to atmosphere when in the normal position shown in Fig. 4.

As viewed in Fig. 4 the plungers 232, 240 and 250 of the ahead and astern pilot valve devices 224 and 225 and of the speed control valve 226 are arranged side by side in spaced relation to move in a vertical direction, while the plunger 246 of the starting control valve device 227 is arranged to move horizontally. For controlling movement of these plungers a shaft 251 is provided which extends over the ends of the plungers of the run control devices 224, 225 and speed control device 226 and parallel to the plunger of the starting control device 227. This shaft is suitably journaled in the casing and carries three cams 252, 253 and 254, the peripheral surfaces of which are arranged for engagement, respectively, with the plungers 232 and 240 of the ahead and astern pilot valve devices 224 and 225, and with one side of one end of an arm 255, the opposite side of which engages plunger 250 of the speed control valve device 226. The other end of arm 255 is fulcrumed on a pin 256 carried by the casing.

The operating shaft 251 is provided with an axial bore in which is slidably mounted a plunger 258 one end of which projects beyond one end of the shaft 251 for connection with one end of a lever 259. The opposite end of lever 259 is fulcrumed on a pin 260 carried by a lug projecting from the casing. Intermediate its ends this lever engages plunger 246 of the starting control valve device 227.

The operating shaft 251 is provided in one side with a slot, and the plunger 258 is provided with an aligned slot 261 and extending into these slots and pivotally mounted on a pin 262 carried in an ear 263 projecting from the shaft 251 is one end of an operator's control lever 264. A pin 265 extending across slot 261 and secured at opposite ends in opposite walls of said slot extends through a recess provided in the end of the operator's control lever 264. By this construction it will be seen that movement of the operator's control lever 264 about the fulcrum pin 262 lengthwise of the control shaft 251 will shift the plunger 258 longitudinally of said control shaft. Thus movement of the plunger out of the position in which it is shown in Fig. 4 of the drawing will rock the lever 259 in a counterclockwise direction to move the plunger 246 into contact with the release valve 245 and then actuate said release valve to open the supply valve 242 of the starting control device 227 for supplying fluid under pressure to the starting control pipe 207, while the return of the operator's lever to the position in which it is shown will operate the plunger 258 and lever 259 to permit closure of the supply valve 242 and the opening of the release valve 245 for releasing fluid under pressure from the starting control pipe 207.

The operator's control device further comprises a cover 268 which is secured to the base portion thereof and which has a slot 269 (Fig. 5) providing for movement of the operator's control lever 264 in a direction about the axis of the control shaft 251 for rocking said shaft. In this slot the operator's control lever 264 may have a "stop" position intermediate the ends of the slot, and at one or an "ahead" side of said "stop" position, a "full speed" position and an intermediate or "run and idle" position. At the opposite side of the "stop" position the lever may have an "astern full speed" position and an intermediate or "run and idle" position, all of these positions being indicated by legends in Fig. 5. Adjacent the "ahead run and idle" position the cover is provided with another slot 271 to permit lateral movement of the lever out of slot 269 for operating the plunger 258 to effect movement of the starting control valve device 227 for supplying fluid under pressure to the starting control pipe 207. A slot 272, like slot 271, is open to slot 269 adjacent the "astern run and idle" position to also permit lateral movement of the operator's control lever 264 to effect operation of the starting control valve device 227 to supply fluid under pressure to the starting control pipe 207. With the operator's control lever out of slots 271 and 272 and in slot 269, the starting control valve device 227 will be operated to open the starting control pipe 207 to the atmosphere.

The cam 252 provided on the control shaft 251 is operative upon movement of the operator's control lever out of "stop" position in the direction of the legend "ahead" (Fig. 5) to effect operation of the ahead pilot valve device 224 to open communication between the fluid pressure supply pipe 76 and the ahead control pipe 205 by the time said lever reaches the "ahead run and idle" position and then to maintain this communication open during further movement to the "ahead full speed" position. In all other positions of the lever 264 the ahead control device 224 will open pipe 205 to the atmosphere. The astern cam 253 is so arranged as to actuate the astern pilot valve device 225 to open the fluid pressure supply pipe 76 to the astern control pipe 206 by the time the operator's control lever obtains "astern run and idle" position upon movement from "stop" position, and to then maintain this communication open during further movement of the lever to the "astern full speed" position. In all other positions of the operator's control lever the cam 253 permits operation of the astern control valve device 225 to open the astern control pipe 206 to atmosphere.

The cam 254 is provided to control displacement of plunger 250 from its normal position into the speed control valve device 226. With the operator's control lever in "stop" position the plunger 250 will occupy its normal position, in which position the speed control pipe 208 will be open to atmosphere, and the cam 254 is so designed as to maintain this condition upon movement of said lever to both "run and idle" positions. Upon movement of the operator's control lever past either "run and idle" position the cam 254 is operative to displace plunger 250 into the speed control device 226 to effect operation thereof for supplying fluid to pipe 208 at a pressure proportional to the extent of such movement, and to provide a maximum pressure of fluid in said pipe in each of the "full speed" positions.

In each of the station selector valve devices 68 the rotary valve 202 is arranged to be held seated, against pressure of fluid which may be acting on the seating face thereof through any of the passages or cavities open to said face, by fluid under pressure supplied to chamber 275 through a passage 276 from, according to another feature of the invention, either the fluid pressure supply passage 106 by way of a check valve 277 or from the ahead or astern control pipes 205 or 206 by way of check valve 278 or 279, respectively, under conditions which will be later brought out. The check valves 277, 278 and 279 are arranged to allow flow of fluid under pressure to chamber 275 but to prevent reverse flow out of said chamber.

The control apparatus above described is identical to that disclosed in the above mentioned copending application, and while the structure thereof has been described in considerable detail, the following description of its operation will be limited to only that deemed necessary for a comprehensive understanding of the invention.

*Operation*

In operation, let it be assumed that fluid pressure storage reservoir 69 is supplied with fluid under pressure, that the cut-off valve 78 is in closed position, and that the cut-out valves 79, 80 and 81 are in their open positions. Fluid at the proper reduced pressure will therefore be supplied by the pressure reducing valve device 70 to pipes 74 and 76 leading to the maneuvering control device 65 associated with engine 1 and to the pilot's control device 67, respectively, while at the same time fluid at the same reduced pressure will be provided by the pressure reducing valve device 71 to pipe 75 through which it will flow to the maneuvering control device 65 associated with engine 2. Fluid under pressure thus supplied to each of the maneuvering control devices 65 will flow to passage 106 therein and thence past the check valve 277 and through passage 276 to the rotary valve chamber 275 for holding the rotary valve 202 seated, and at the same time, fluid will also flow from passage 106 through chamber 105 and passage 104 to chamber 103 in the brake and fuel control device 156 and from chamber 103 through passage 102 to chamber 96 containing the fluid pressure supply valves 95 and 140 of the ahead and astern control valve devices 93 and 94, respectively.

Let it further be assumed that lever 203 and thereby rotary valve 202 in each of the selector valve devices 68 is in the remote control position rendering the engineer's control devices 66 ineffective for controlling operation of the respective engines and rendering the pilot's control device 67 effective to control operation of said engines.

Let it further be assumed that the pilot's control lever 264 is in "stop" position and that the engines are stopped from last operation in an ahead direction and that the pilot desires to restart the engines in the ahead direction and to accomplish this moves said lever to the "ahead run and idle" position for effecting operation of the ahead pilot valve device 224 to supply fluid under pressure from the supply pipe 76 to the ahead control pipe 205.

Fluid under pressure thus supplied to the ahead control pipe 205 will flow to each of the maneuvering control devices 65 and therein be transmitted through cavity 209 in the selector rotary valve 202 to passage 133 and thence to passage 131 leading to diaphragm chamber 130 in the respective ahead control valve device 93. When the pressure of fluid thus obtained in chamber 130 and acting on one side of diaphragm 129 in each of the ahead control valve devices 93 is increased to a degree sufficient to overcome the opposing force of spring 123, said diaphragm will deflect to close the respective release valve 107 and open the supply valve 95 for supplying fluid under pressure from chamber 96 to chamber 97.

In each maneuvering control device, fluid under pressure then flows from chamber 97 through passage 98 and past the check valve 100 to chamber 89 above the reversing piston 88. At this time chamber 91 below the reversing piston 88 is open to the atmosphere through choke 152, passage 151 and past the release valve 141 in the respective astern control valve device 94, so that the pressure of fluid provided in chamber 89 is rendered effective to move the reversing piston 88 downwardly from its astern position in which it is shown in Fig. 2 to its ahead position in contact with pressure head 92, which movement reverses the valve timing of the respective engine to provide for starting and running of the engine in its ahead direction.

At the same time as fluid under pressure is supplied from the ahead control valve device 93 to chamber 97 and thence to chamber 89 above the reversing piston 88 in each maneuvering control device 65, fluid from chamber 97 will also flow through passage 178 to the upper end of the double check valve 182 and move said check valve to the position in which it is shown in the drawing in case it is not already in such position, whereupon fluid will flow past said check valve to passage 180 and thence to chamber 173 above the diaphragm 172 in the respective brake and fuel control valve device 156. When the pressure of fluid thus obtained in diaphragm chamber 173 is increased sufficient to overcome the opposing pressure of spring 169 the diaphragm will move downwardly to close the supply valve 171 and to open the release valve 170, whereupon fluid under pressure will be released from pipes 59 and 59a and the respective fuel cut-out cylinder 58 to permit operation of said cylinder to move lever 56 of the fuel control device 55 to its fuel supply position indicated by the dot and dash line 57. This release of fluid under pressure from pipe 59 at both engines will also permit release of fluid under pressure from pipes 23 and 24 through the respective brake interlock valve devices 25 and 26 and thereby from the brake control relay valve device 18 which will then operate to effect a release of the brake on the propeller shaft 11, in order that the propeller may be turned by the engine upon the running thereof.

As the reversing piston 88 in each of the maneuvering control devices 65 is moved from its astern position to its ahead position, the passage 197 is opened to the chamber 89 after a certain slight movement of the piston out of the astern position, whereupon fluid supplied to chamber 89 for moving the piston 88 will flow to said passage and thence to chamber 192 in the double check valve device 185. The pressure of fluid thus provided in chamber 192 and effective on the check valve 191 will then move said valve into contact with the seat rib 190 against opposing pressure of fluid which may be effective in chamber 195 on the check valve 194, and which opposing pressure will substantially equal that provided in chamber 91 by movement of piston 88. At substantially the time the reversing piston 88 attains its ahead position in contact with the pressure head 92, the passage 198 will be opened to chamber 89 above said piston, whereupon fluid effective in said chamber will flow to passage 198 and thence to chamber 195 in the double check valve device 185. Fluid thus provided in chamber 195 will then flow past the unseated check valve 194 to passage 166 and thence through choke 165 and passage 164 to chamber 163 above diaphragm 159 in the starting control valve device 155. When a sufficient pressure is thus obtained in chamber 163 to overcome the opposing pressure of control spring 167 the diaphragm 159 will deflect to close the respective release valve 158 and open the supply valve 157.

The opening of valve 157 in each maneuvering control device 65 as just described will, however, be without effect at this time since chamber 160, which is connected to the starting control pipe 207, is open to the atmosphere by way of the starting control valve device 227 in the pilot's control valve device 67 with the pilot's control lever 264 in the "ahead run and idle" position adjacent to but out of the start slot 271. Movement of the pilot's control lever 264 into slot 271 will however operate the starting control device 227 to supply fluid to the starting control pipe 207 and thence to chamber 160 in the starting control valve device 155 in both maneuvering control devices. In each maneuvering control device the fluid thus supplied to chamber 160 will then flow past valve 157 in the starting control device 155 to pipe 31 and thence to the respective starting cylinder 39. When the pressure of fluid in the cylinders 39 is then increased to a sufficient degree, said cylinders at both engines will operate the starting air valves 36 to supply starting air to pipes 34 from which it will flow through the different pipes 35 to the engine cylinders for causing the engines to start turning in the direction determined by the engine valve gearing as adjusted by the respective reversing pistons 88. With the fuel control devices 55 adjusted as above described to supply fuel to the engines, such fuel will be provided or injected as the engines are placed in motion by the starting air from pipes 34 and will thus be effective to cause the engines to immediately fire and run in the selected direction.

After the engines are thus placed in motion and are running on fuel supplied thereto, the pilot will move his control lever 264 out of slot 271 to the "ahead run and idle" position to operate the starting control device 227 to release fluid under pressure from the starting control pipe 207 and thereby from pipes 31 and the starting air cylinders 39 on both engines, whereupon said cylinders will operate the respective starting valves 36 to cut off the supply of starting air to pipes 34. With the pilot's control lever 264 in the "ahead run and idle" position conditioning the speed control device 226 to open the speed control cylinder 53 at both engines to atmosphere, the engines will then continue to run on fuel at an idling speed.

The pilot may now accelerate the two engines in unison to any desired speed above idling by suitable adjustment of the control lever 264 between the "ahead run and idle" position and the "ahead full speed" position for supplying fluid to the speed control cylinders 53 at a pressure to provide corresponding adjustment of the governor control levers 51 at the two engines, as will be apparent.

Now assume that with the engines stopped the pilot desires to start them in the reverse or astern direction. To accomplish this he will move lever 264 from the "stop" position to the "astern run and idle" position and then into the starting slot 272. This operation of the pilot's control lever will actuate the reverse pilot valve device 225 to open the astern control pipe 206 to chamber 229 for supplying fluid under pressure from pipe 76 to said control pipe.

Fluid under pressure thus supplied to the astern control pipe 206 will flow to each of the maneuvering control devices 65 and thence through passage 146 and choke 145 to chamber 143 in the respective astern control device 94, wherein it will act to deflect the diaphragm 142 downwardly to close the respective release valve 141 and open supply valve 140. The opening of the supply valve 140 in the astern control device 94 of each maneuvering control device will supply fluid under pressure from supply pipe 74 or 75, as the case may be, to chamber 159 from which it will flow in one direction through passage 151 and past check valve 153 to chamber 91 below the reversing piston 88, for moving said piston from the ahead position in contact with pressure head 92 to its astern position shown in Fig. 2.

At the same time as fluid under pressure is supplied from the astern control device 94 through chamber 150 to chamber 91 in each of the maneuvering control devices, fluid pressure will also flow from said chamber 150 through passage 179 to the lower end of the double check valve 182 and move said check valve to its upper position, since passage 178, open to the opposite end of the check valve, is at this time open to atmosphere through the respective ahead control valve device 93. In the upper position of the double check valve 182 fluid under pressure will then flow from passage 179 to passage 180 and thence to diaphragm chamber 173 in the brake and fuel control valve device 156 to cause operation of said device to release fluid under pressure from pipe 59 on the respective engine to permit operation of the fuel control cylinder 58 to return the fuel cut off device 55 on said engine to its fuel cut-in position. This release of fluid under pressure from pipe 59 at the two engines will also permit release of the brake on the propeller shaft 11.

In each maneuvering control device, movement of the reversing piston 88 from its ahead position in contact with pressure head 92 to its astern position shown in Fig. 2, will first open passage 198 to chamber 91 so that fluid under pressure will flow from said chamber to chamber 195 in the double check valve device 185, and this pressure acting on the check valve 194 will move same into contact with its seat 193 and thus move the check valve 191 out of engagement with its seat 190. When the reversing piston 88 then attains its astern position, fluid will be supplied from chamber 91 to passage 197 and this fluid will flow past the check valve 191 in the double check valve device 185 to passage 166 and thence through choke 165 to chamber 163 above diaphragm 159 in the starting control valve device 155. The diaphragm 159 will thereby be deflected to close the release valve 158 and open the supply valve 157 to permit fluid under pressure supplied to the starting control pipe 207 by way of the pilot's control device 67 in its "astern start" position to flow to the starting pipe 31 to thereby effect operation of the starting air cylinder 39 and starting air valve device 36 to supply starting air to the starting pipe 34 on the respective engine. The two engines will then be placed in motion by the starting air supplied to the respective pipes 34, and since the fuel control devices 55 on the engines were previously conditioned for supplying fuel to the engines, the engines, after being placed in motion by starting air, will fire and run on fuel.

After the two engines have been thus started and are running on fuel, the pilot will move his control lever 264 out of the slot 272 back to "astern run and idle" position to release fluid under pressure from the starting air cylinders 39 at the two engines for thereby cutting off the supply of starting air to the engines. The pilot may then adjust his control lever 264 in the direction of the "astern full speed" position as required for accelerating the two engines to provide the desired rate of movement of the ship in the astern direction.

In order to stop the engines from either direction of operation the pilot need only move the control lever 264 back to "stop" position in which both the ahead and astern control pipes 205 and 206 are opened to the atmosphere. The ahead or astern control valve device 93 or 94, whichever was last effective in the two maneuvering control devices 65 to determine the direction of operation of the engines, will then operate upon the release of fluid under pressure from the respective control pipes 205 or 206, to release actuating fluid pressure from the respective reversing piston chambers 89 and 91 past the release valve 107 or 141, as the case may be, and also from chamber 173 past the check valve 182 in the respective fuel and brake control device 156. The parts of the fuel and brake control device 156 in both maneuvering control devices will then return to the positions in which fluid under pressure will be supplied from pipe 74 or pipe 75 to pipe 59 on the engine to operate the cylinder 58 to actuate the fuel cut-off device 55 to its fuel cut-off position to allow stopping of the engines. Fluid pressure thus provided in pipes 59 on the engines will also flow to the brake interlock valve devices 25 and 26, and thence to pipes 23 and 24 and from one or the other of pipes 23 or 24 through the double check valve device 22 to effect operation of the brake relay valve device 18 to apply the brake to the propeller shaft 11 for bringing the two engines to a stop.

In the operation above described it will be noted that the fluid under pressure supplied by the pilot's control device to the ahead control pipe 205, the astern control pipe 206, the starting pipe 207 and the speed control pipe 208 flows to the seating face of the rotary valve 202 in each of the selector valve devices 68 and thence through said valve to effect their respective control operations. Likewise fluid under pressure from the supply pipes 74 and 75 flow to the seat of the rotary valves 202 of the respective selector valve devices. The pressure of fluid thus provided at the seats of these rotary valve acts thereon tending to unseat same. Unseating of each of these rotary valves is however normally prevented during operation of the apparatus by fluid at supply pressure provided in the rotary valve chamber 275 by flow from passage 106, past the check valve 277 and through passage 276.

In the maneuvering control device 65, associated with engine 1, the supply of fluid to passage 106 is obtained from the reducing valve device 70 through pipe 74, while in the maneuvering control device associated with engine 2 this supply of fluid to passage 106 is obtained from pipe 75 supplied with fluid under pressure from the reducing valve device 71. With both pipes 74 and 75 thus supplied with fluid under pressure, as normally intended, the communications controlled by check valves 278 and 279 perform no useful function.

In case of failure of the supply of fluid pressure to pipe 75, due for instance to rupture of said pipe or to failure of the reducing valve device 71 to operate as intended, a loss of fluid under pressure from the rotary valve chamber 275 of the selector valve device 68, associated with engine 2, may occur by leakage past the check valve 277. If the pilot's control valve device is then moved to either one of the "run and idle" positions for supplying fluid under pressure to either the ahead control pipe 205 or astern control pipe 206, the rotary valve 202 at engine 2 will not be blown from its seat thereby, since said pressure will become effective through the connection including the check valve 278 or check valve 279 in the rotary valve chamber 275 at engine 2 to act on and maintain the rotary valve 202 in said chamber seated against the pressure of fluid from the one of said pipes acting on the seating face of the valve.

The communications including the check valves 278 and 279 in the maneuvering control device 65, associated with engine 1, will not and are not intended to act in the manner just described for those associated with engine 2 in case of failure of fluid pressure in the supply pipe 74, since such failure will result in failure of supply of fluid pressure to the pilot's control device 67 rendering same ineffective to supply fluid under pressure to either the ahead or astern control pipes 205 or 206.

When an operator is working on an engine making adjustment to the valve gear or any other part of the engine, it is desirable to prevent that engine from being unintentionally started by operation of either the engineer's control device 65 or of the pilot's control device 67, and this may be accomplished by the cut-off valves 80 and 79 which may be located immediately adjacent the respective engines 1 and 2.

As before mentioned, both of the cut-off valves 80 and 79 are of the type arranged to close communication through the pipes in which they are disposed and to release fluid under pressure from the pipe connected to the outlet side thereof. Thus movement of the cut-off valve 80 to its closed position will vent the fluid pressure from the pipe between said valve and the maneuvering control valve 65 associated with engine 1 and thereby release the fluid pressure from passage 106 in the bracket 85 and thus from valve chamber 96 in the respective ahead and astern control valve devices 93 and 94.

In case the pilot's control valve device 67 should be unintentionally operated, with the cut-off valve 80 closed, to supply fluid to either the ahead or astern control pipe 205 or 206 and thence to either the ahead or astern valve device 93 or 94 at engine 1, the operation of the latter device will have no effect upon the reversing piston 88 at said engine, and said piston will remain in its last occupied position with the chambers at the opposite sides open to atmosphere either by way of the release valves 97 and 141 in said ahead or astern control valve devices, or past the supply valves 95 and 141 to chamber 96 which will be open to the atmosphere at this time by way of the closed cut-off valve 80. Movement of the pilot's control valve device 67 to either "start" position will supply fluid under pressure to the starting control pipe 207 through which it will flow to chamber 160 in the starting control device 155 at engine 1, but said starting control device cannot be operated to supply fluid to the starting air pipe 31 with the cut-off valve 80 closed and causing chambers 89 and 91 at opposite sides of the reversing piston 88 to be open to the atmosphere. Thus with the cut-off valve 80 closed the maneuvering control device 65, associated with engine 1, cannot be operated from either the pilot's or engineer's station to change the condition of said engine while being worked upon by a workman, and the same is true with respect to engine 2 upon closing of the cut-off valve 79.

The closing of the cut-off valve 80 with the consequent cutting off of the supply of fluid under pressure for holding seated the rotary valve 202 in the selector valve device 68 associated with engine 1 would result, in case of loss of fluid pressure from said chamber by leakage past the check valve 277, in blowing the rotary valve 202 off of its seat upon operation of the pilot's control device 67 for controlling the operation of engine 2, in case it is in an operating condition. This however is prevented by supplying fluid under pressure to the rotary valve chamber from either the ahead or astern control pipes 205 or 206 by way of the check valves 278 or 279, respectively, in the manner above described.

In a like manner the communications including check valves 278 and 279 in the selector valve device 66, associated with engine 2, function to prevent the rotary valve 202 therein from being blown from its seat upon operation of the pilot's control device 67 in case the cut-off valve 79 in the fluid pressure supply connection to the maneuvering control device 65 associated with engine 2 is closed.

The closing of either cut-off valve 79 or 80 cuts off the supply of fluid pressure to the respective engineer's control device 66, so that operation of said device can have no effect upon the respective maneuvering control device 65.

From the above description it will be seen that in each maneuvering control device, the purpose of check valve 277 is to prevent flow to passage 106 of fluid supplied past either check valve 278 or 279 to passage 276. The check valve 278 acts in a like manner upon supply of fluid under pressure to passage 276 past either check valve 277 or 279, while check valve 279 also acts in the same manner upon supply of fluid under pressure to passage 276 past either check valve 277 or 278.

*Summary*

From the above description it will now be seen that we have provided a fluid pressure control apparatus embodying a dual fluid pressure supply system each of which is normally employed but which in case of failure of either supply provides for continued operation of the apparatus by fluid under pressure from the other supply. The apparatus further embodies novel arrangements to insure integrity of operation thereof in case of failure of either fluid pressure supply and to positively protect a workman against injury while working on the engine in case of operation of either the pilot's or engineer's control devices.

Having now described our invention what we claim as new and desire to secure by Letters Patent, is:

1. A control system comprising in combination, two separate control devices each comprising a rotary valve contained in a chamber and having a fluid conducting communication open to the seating face of said rotary valve and arranged to be charged with fluid under pressure which will act on said rotary valve and tend to unseat same, two individual fluid pressure supply pipes one connected to each of said chambers for supplying fluid under pressure thereto to act on said rotary valve to hold same seated, a check valve in the connection between each of said pipes and the respective chamber arranged to prevent backflow of fluid under pressure from the chamber, a single control device operable to supply fluid under pressure from one of said pipes to both of said fluid conducting communications, a connection in each of said control devices between said fluid conducting communication therein and the respective rotary valve chamber providing for flow of fluid under pressure from the fluid conducting communication therein to the respective rotary valve chamber, and a check valve in each of said connections arranged to prevent flow of fluid out of the respective chamber to the connection with the respective fluid conducting communication.

2. A control system comprising in combination, two separate control devices each comprising a rotary valve contained in a chamber and having a fluid conducting communication open to the seating face of said rotary valve and arranged to be charged with fluid under pressure which will act on said rotary valve and tend to unseat same, two individual fluid pressure supply pipes one connected to each of said chambers for supplying fluid under pressure thereto to act on said rotary valve to hold same seated, a check valve in the connection between each of said pipes and the respective chamber arranged to prevent backflow of fluid under pressure from the chamber, a single control device operable to supply fluid under pressure from one of said pipes to both of said fluid conducting communications, a connection in each of said control devices between the fluid conducting communication therein and the respective rotary valve chamber providing for flow of fluid under pressure from the fluid conducting communication therein to the respective rotary valve chamber, a check valve in each of said connections arranged to prevent flow of fluid out of the respective chamber to the connection with the respective fluid conducting communication, and a cut-off valve device in each of said supply pipes operable to cut off the supply of fluid under pressure to the respective control device and to release the fluid under pressure from the connection to such control device, the said cut-off valve device in said one supply pipe being disposed between the respective check valve and the connection between said one supply pipe and said single control device.

3. A control device comprising a valve contained in a chamber, a communication opening to the seat of said valve and arranged to be charged with fluid under pressure which will act on said valve and tend to unseat same, a passage for supplying fluid under pressure to said chamber to act on said valve for holding same seated against pressure of fluid in said communication, a check valve in said passage arranged to prevent back-flow of fluid under pressure through said passage out of said chamber, another passage connecting said communication to said chamber, a check valve in the last named passage arranged to prevent flow of fluids under pressure therethrough out of said chamber, another passage open to said valve seat, and means in said valve for opening said communication to the last named passage in a chosen position of said valve on said seat.

4. A control system comprising in combination, two separate means each comprising a rotary valve contained in a chamber and having a fluid conducting communication open to the seating face of said valve and arranged to be charged with fluid under pressure which will act on said rotary valve and tend to unseat same, two individual fluid pressure supply pipes one connected to each of said chambers for conveying fluid under pressure thereto to act on the respective rotary valve to hold same seated, an operator's control device operable to open one of said supply pipes to said communication in both of said separate means to permit flow of fluid under pressure to said communication, a check valve in each of said supply pipes for preventing flow of fluid under pressure through the respective pipe in the direction away from the respective one of said chambers, a third pipe connected to one of said two supply pipes between the respective check valve and chamber and also connected to the other of said supply pipes between the respective check valve and chamber, and a two position valve disposed in and controlling communication through said third pipe and operative in one of said two positions to close communication through said third pipe and in the other of said two positions to open communication through said third pipe.

5. A control system comprising in combination, two fluid pressure supply pipes, two fluid pressure controlled valve devices to each of which one of said pipes is connected, and each of said valve devices being operable by fluid under pressure to establish a communication to the respective pipe to permit flow of fluid under pressure from the respective pipe to effect a desired operation, an operator's control device operable to supply fluid under pressure from one of said pipes to both of said fluid pressure controlled devices to effect operation thereof, a check valve in each of said pipes for preventing flow of fluid through the pipe in a direction away from the respective fluid pressure controlled valve device, a third pipe connected to one of said pipes between the respective check valve and fluid pressure controlled valve device and connected to the other pipe between the respective check valve and fluid pressure controlled valve device, and a valve in said third pipe controlling communication through said third pipe between said one and other pipes and selectively operable to either open or close such communication.

HARRY C. MAY.
ROY R. STEVENS.

REFERENCES CITED

The following references are of record in the file of this patent:

UNITED STATES PATENTS

| Number | Name | Date |
| --- | --- | --- |
| 345,056 | Henneboehle | July 6, 1886 |
| 553,851 | Hardie | Feb. 4, 1896 |
| 711,755 | Blake | Oct. 21, 1902 |
| 845,708 | Fulton | Feb. 26, 1907 |
| 1,507,973 | Mohn | Sept. 9, 1924 |
| 1,947,616 | Riney | Feb. 20, 1934 |
| 2,091,110 | Smallen | Aug. 24, 1937 |